United States Patent [19]
Jones et al.

[11] 3,886,963
[45] June 3, 1975

[54] VALVE

[75] Inventors: Elvis E. Jones; William A. Mays; William F. Smith, all of Lake Jackson, Tex.

[73] Assignee: The Dow Chemical Company, Midland, Mich.

[22] Filed: Oct. 10, 1973

[21] Appl. No.: 404,960

[52] U.S. Cl. .............................. 137/334; 425/245 R
[51] Int. Cl. ............................................... B29f 1/05
[58] Field of Search .......... 425/245, 159, 346, 407, 425/247; 137/375, 334, 340

[56] References Cited
UNITED STATES PATENTS

| 2,770,011 | 11/1956 | Kelly | 425/245 |
| 2,912,719 | 11/1959 | Gilmore | 425/245 |
| 3,498,315 | 3/1970 | Graves | 137/375 |
| 3,530,539 | 9/1970 | Gellert | 425/245 |
| 3,650,654 | 3/1972 | Schwartz | 425/245 X |

Primary Examiner—Henry T. Klinksiek
Attorney, Agent, or Firm—Earl D. Ayers

[57] ABSTRACT

The invention is a rod actuated valve for applying thermosetting resins to molds. Two molds, coupled to the valve, are filled alternately; one mold being filled while the other is hardening and the part is removed. This allows the thermosetting material to flow constantly and injects all of the mixed material into the mold cavity, eliminating the sprue and the attendant wasted material.

3 Claims, 2 Drawing Figures

VALVE

BACKGROUND OF THE INVENTION

This invention relates to valves for use in applying thermosettable and other materials to mold cavities and particularly to a distribution valve wherein material may be applied selectively to either of a pair of molds while keeping all material passing through the valve under constant movement.

In the manufacture of articles from a thermosettable resin by a molding process, it is usually necessary that the resin and catalyst or hardener be intimately mixed and then introduced into a mold. As the material in the mold hardens, the material in the mixer and transfer lines between the mixer and mold also hardens and results in plugged mixer and lines. To overcome this difficulty, it is a common practice to flush out the mixer and lines up to a point close to the mold with a solvent. A three-way valve may be used in this process such that after the mold has been filled, the flow of material may be diverted to a waste receptacle leaving the mold closed and the mixer and lines up to the valve open for solvent flow. The thermosetting material between the valve and the mold then is removed as a part of the molded article. This is called a sprue and is usually removed from the part and discarded as waste.

In another process for molding thermoset resin, the mixer is attached directly to the mold and after the material has been inserted into the mold, the mixer and the sprue section of the mold is cooled to prevent the material from hardening. This requires that the sprue section of the mold be insulated from the cavity section to prevent heat transfer. This is commonly referred to as cold runner molding. Some sort of gate device is required inside the mold to separate the material in the cavity from that in the sprue or runners. This process is impractical in molding certain resins because the reaction is so fast that there is not enough time to cool the material before the reaction initiates. Further, the molds are difficult to make and are very expensive.

OBJECTS OF THE INVENTION

Accordingly, a principal object of this invention is to provide an improved valve for dispensing materials to alternate utilization devices.

Another object of this invention is to provide an improved valve for dispensing thermosetting materials to mold cavities.

STATEMENT OF INVENTION

In accordance with this invention there is provided a valve assembly including a solid body part having a materials inlet bore extending into said body part and a pair of materials outlet bores extending through said body part, each of said outlet bores communicating with said inlet bore by intersecting therewith. Each outlet bore contains an axially movable closely fitting rod which is longer than the outlet bore.

Each outlet bore has a straight conduit whose inner diameter equals the outlet bore diameter coupled to one end thereof and rod movement control means coupled to the other end thereof. The unattached end of each conduit is adapted to be coupled to a mold cavity, for example. The length of each rod is longer than the distance from the inlet bore to the unattached end of its outlet bore.

DETAILED DESCRIPTION OF THE DRAWING

Figure 1:
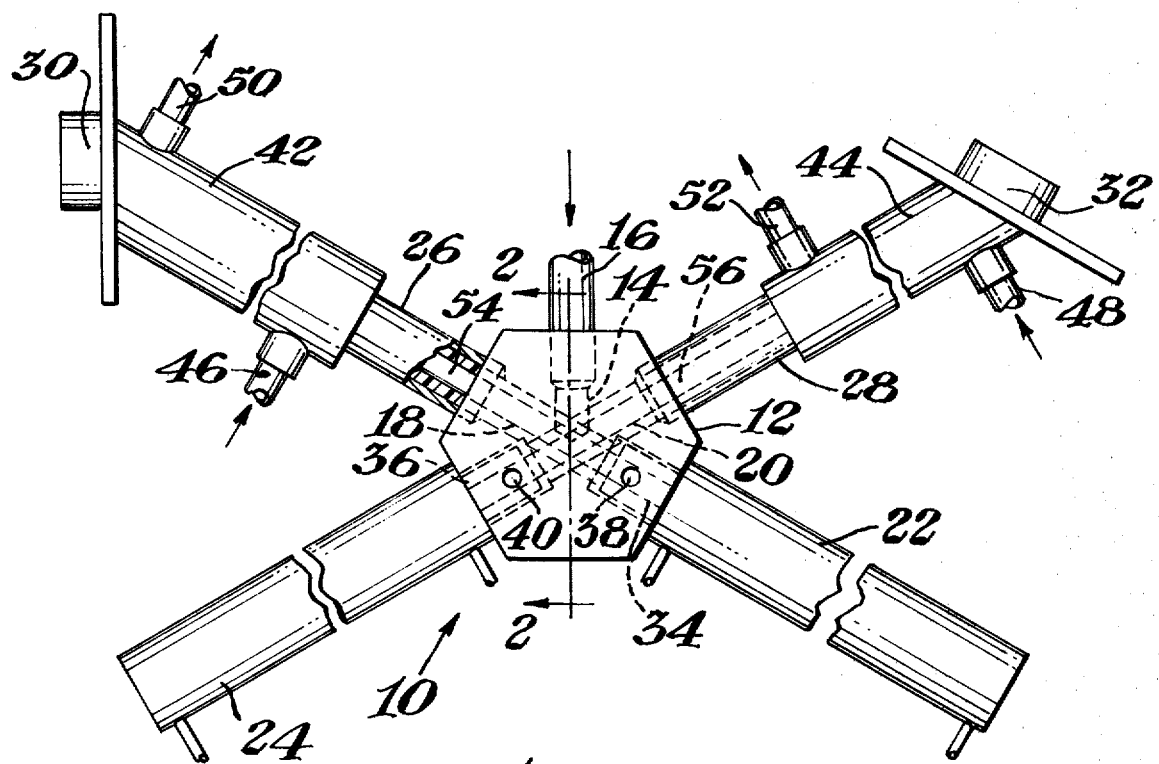
FIG. 1 is a plan view, partly broken away and in section, of valve apparatus in accordance with this invention.
Figure 2:
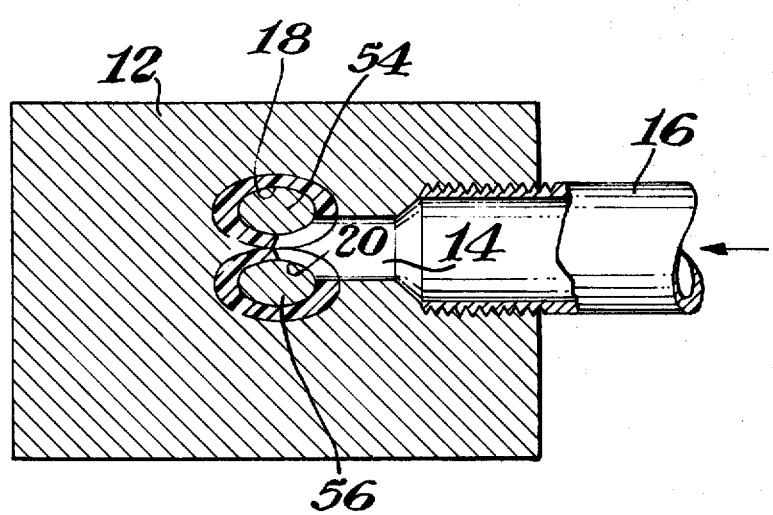
FIG. 2 is a sectional view taken along the line 2—2 of FIG. 1.

Referring to the drawing, there is shown valve apparatus, indicated generally by the numeral 10, comprising a block-like solid body part 12 having an inlet bore 14 extending into the body part 12, the bore 14 being coupled to an inlet line 16.

A pair of outlet bores 18, 20 extend through the body part 12 and each intersect the inner end part of the inlet bore 14. One end of each bore 18, 20 has rod (piston) advancement and retraction apparatus 22, 24 coupled to it. The opposite end of each bore 18, 20 is coupled to an outlet conduit 26, 28 which is adapted at its outer end 30, 32 to be coupled to a mold (not shown), for example.

The conduits 26, 28 and the outlet bores connecting therewith each have their interior surfaces lined, as with Teflon (polytetrafluoroethylene), forming a continuous passage of constant diameter at least from the intersection of the outlet bores 18, 20 with the inlet bore 14. Each bore 18, 20 contains a counter-bore 34, 36 which extends from the part of the body part 12 to which each advancement and retraction apparatus 22, 24 is attached to near the point of intersection with the inlet bore 18. Each counter-bore is closed at its outer end by the apparatus 22 or 24.

Each counter-bore 34, 36 has a small bore 38, 40 extending from the counter-bore to the exterior surface of the body part 12.

An elongated piston or plunger rod 54, 56 is disposed in the outlet bores 18, 20 and conduits 26, 28 respectively, one end of each piston being attached to the advancement and retraction apparatus 22 or 24. Each plunger rod 54, 56, conveniently made from a rigid, hard metal, such as stainless steel, for example. When the advancement and retraction apparatus is in its advanced position, its plunger rod extends to the outer end (30 or 32) of the outlet conduit. In its retracted position each plunger rod is disposed so that its outlet bore 18 or 20 is open to the inlet bore 14 at their intersection.

Each of the conduits 26, 28 has a cooling jacket 42, 44 surrounding it and extending from at or near the mold attachment end to near to the body part 12. Coolant inlets and outlets 46, 48 and 50, 52, respectively, are provided.

The advancement and retraction apparatus 22, 24 is, usually, a pneumatic cylinder device, although hydraulic, mechanical or solenoid actuated devices could be used.

OPERATION

In operation, the end parts 30, 32 of the conduits 26, 28 are coupled to mold cavities (not shown). The inlet conduit 16 is coupled to a mixer (not shown) to conduct thermosettable resin materials therefrom to the valve apparatus 10.

The plunger rod in the outlet bore and conduit coupled to the mold cavity to be filled is fully retracted, permitting the thermosetting materials to flow through the valve apparatus 10 and conduit to the mold cavity (not shown). After a predetermined time, depending on the capacity of the mold cavity and the flow rate of the thermosettable materials, that plunger rod is advanced to shut off further entry of material to its outlet bore and to expel all material from the outlet bore and conduit.

The other plunger rod is then retracted to permit thermosettable materials to flow through the valve and the other outlet conduit to the second mold cavity. In the meantime, the first mold cavity is opened, the molded product removed, and then re-set for refilling of that mold cavity.

It is practical, but not essential, that the plunger rods be moved simultaneously (one in, one moved out) so that continuous flow occurs through the valve.

The plunger rods fit closely but slidably within their outlet bores and conduits, thus effectively cleaning all thermosettable material from the bores and conduits.

A lubricant or solvent is applied to the counterbores 34, 36 through the bores 38, 40, thereby permitting the lubrication or cleaning of almost the entire length of each plunger rod each cycle of operation of the rod.

Because the plunger rods expel all thermosettable material into the mold cavity, very little material is wasted and, with proper mold design, sprues can be eliminated.

What is claimed is:

1. A valve assembly for directing a moldable material into a mold cavity, the assembly including the combination of:
   a valve body;
   a first flow bore and second flow bore which extend through the valve body, which intersect with each other within the valve body, which are positioned transverse to each other within the valve body, which communicate with a first and second mold cavity, and wherein each bore is adapted for carrying moldable material into the first and second mold cavities;
   an inlet bore which extends into the valve body, which communicates with the first and second flow bores, and which is adapted to carry a moldable material into the first and second flow bores;
   a first plunger rod which fits slidably within the first flow bore, and which will extend, in advance position, beyond the point at which the inlet bore communicates with the first flow bore;
   a second plunger rod which fits slidably within the second flow bore and which will extend, in advance position, beyond the point at which the inlet bore communicates with the second flow bore;
   means connected to the first and second plunger rods for independently advancing and retracting the said rods within the first and second flow bores, to thereby alternately direct the moldable material into the first or second mold cavity.

2. The valve assembly of claim 1 in which a fluid-operated cylinder is coupled to the first plunger rod, for advancing and retracting the rod in the first flow bore.

3. The valve assembly of claim 1 in which a fluid-operated cylinder is coupled to the second plunger rod, for advancing and retracting the rod in the second flow bore.

* * * * *